United States Patent
Merkel et al.

(10) Patent No.: US 7,783,938 B1
(45) Date of Patent: Aug. 24, 2010

(54) RESULT DIRECTED DIAGNOSTIC METHOD AND SYSTEM

(75) Inventors: William F. Merkel, Aurora, OH (US); Paul Grinberg, University Heights, OH (US)

(73) Assignee: Keithly Instruments, Inc., Cleveland, OH (US)

( * ) Notice: Subject to any disclaimer, the term of this patent is extended or adjusted under 35 U.S.C. 154(b) by 282 days.

(21) Appl. No.: 12/183,311

(22) Filed: Jul. 31, 2008

(51) Int. Cl.
*G06F 11/00* (2006.01)

(52) U.S. Cl. .................................. 714/703; 714/736

(58) Field of Classification Search .................. None
See application file for complete search history.

(56) References Cited

U.S. PATENT DOCUMENTS

| | | | | |
|---|---|---|---|---|
| 5,999,002 | A * | 12/1999 | Fasnacht et al. | 324/525 |
| 6,192,496 | B1 * | 2/2001 | Lawrence et al. | 714/724 |
| 2003/0229410 | A1 * | 12/2003 | Smith et al. | 700/109 |
| 2004/0207427 | A1 * | 10/2004 | Smith | 324/765 |
| 2005/0140976 | A1 * | 6/2005 | Hovinen et al. | 356/369 |
| 2007/0037301 | A1 * | 2/2007 | Jekauc | 438/14 |
| 2007/0057687 | A1 * | 3/2007 | Kadyshevitch et al. | 324/765 |
| 2010/0148813 | A1 * | 6/2010 | Erickson | 324/758 |

* cited by examiner

*Primary Examiner*—John P Trimmings
(74) *Attorney, Agent, or Firm*—Pearne & Gordon LLP

(57) ABSTRACT

Provided is a method and system for diagnosing a test system to determine whether a condition of the test system contributed to an undesirable measurement result. The method includes interrogating a device under test comprising at least one of transmitting an electric signal to energize a device under test by the test system and conducting a passive measurement that does not require the device under test to be energized to be performed to determine if the device under test satisfies a design parameter. The method further includes processing an output signal including at least one of a responsive electric signal transmitted from the device under test in response to being energized and a passive signal corresponding to the passive measurement, and comparing a value of a property of the output signal to a reference value. Responsive to the comparing, the method determines whether the value of the output signal is within an acceptable tolerance of the reference value. A diagnostic routine is initiated on at least a portion of the test system involved in processing of the output signal and comparing the value of the output signal to the reference value when the value of the output signal falls outside of the acceptable tolerance.

11 Claims, 2 Drawing Sheets

RESULT DIRECTED DIAGNOSTIC METHOD AND SYSTEM

BACKGROUND OF THE INVENTION

1. Field of the Invention

The present invention is directed generally toward diagnostic equipment and, more specifically, to a method and system for diagnosing a test system for malfunctions when a tested quantity falls outside of a range of expected values.

2. Description of Related Art

Electronic test units often measure multiple electronic properties of signals conducted by circuits provided to a device under test ("DUT"). Measuring a plurality of electrical properties of a DUT with a common test system provided with a plurality of source/measurement units ("SMUs") eliminates the need for transporting the DUT to different test systems at various locations to complete each of the desired measurements. Sophisticated systems commonly include dedicated circuits for receiving each signal from the DUT and conducting the different measurements located at a common test station.

While such sophisticated test systems simplify the process for conducting multiple measurements on the same DUT, their complexity makes it difficult to pinpoint the possible cause of an errant measurement. Upon taking a measurement that falls outside of a range of expected values many conventional test systems merely return the outlying measurement, leaving it to a human operator to manually determine whether the errant measurement resulted from a faulty DUT, a problem with a portion of the test system, or any one of many other possible causes.

Other test systems allow an operator to manually initiate, or periodically initiate on regular intervals a global diagnostic procedure to be carried out by the test system to determine if the test system, or a portion thereof, is experiencing any problems that could cause an errant measurement result. Routinely conducting a global diagnostics routine on the test system both minimizes the risk of a faulty DUT passing the tests conducted thereon, and minimizes the waste resulting from erroneous failures of DUTs caused by a malfunctioning test system. Such global diagnostic procedures step through a predetermined diagnostic routine that checks the operation of all the various circuits of the test system provided for conducting different measurements in an effort to locate the cause of the errant measurement. However, during such diagnostic routines the test system relies on an internal or external signal generator that generates a dedicated test signal having known properties to be measured by the various different circuits of the test system. If the measured properties do not fall within a predetermined tolerance of the test signal's known properties it is concluded that a portion of the test system is malfunctioning. But to conduct such a global diagnostic routine the test system must be taken out of service, at least temporarily until the diagnostic routine is complete, before testing of DUTs can resume. Because global diagnostic routines are lengthy, conducting such global diagnostics often leads to expensive downtime that slows quality control and production of electronic components. But not conducting global diagnostics frequently enough can allow a malfunction of the measurement instrument to go undetected for significant periods of time, possibly allowing defective DUTs to erroneously pass testing.

Accordingly, there is a need in the art for a method and system for minimizing the time required for diagnosing a test system to determine whether a possible malfunction exists. The method and system can diagnose possible problems with the test system, or a portion thereof, based at least in part on an experimental measurement performed on electric signals conducted by a device under test under normal testing conditions, and can optionally focus the scope of diagnosing possible malfunctions to electric circuit components of the measurement instrument involved in conducting the experimental measurement when the existence of a possible malfunction is discovered.

BRIEF SUMMARY OF THE INVENTION

According to one aspect, the present invention provides a method and system for diagnosing a test system to determine whether a condition of the test system contributed to an undesirable measurement result. The method includes interrogating a device under test comprising at least one of transmitting an electric signal to energize a device under test by the test system and conducting a passive measurement that does not require the device under test to be energized to be performed to determine if the device under test satisfies a design parameter. The method further includes processing an output signal including at least one of a responsive electric signal transmitted from the device under test in response to being energized and a passive signal corresponding to the passive measurement, and comparing a value of a property of the output signal to a reference value. Responsive to the comparing, the method determines whether the value of the output signal is within an acceptable tolerance of the reference value. A diagnostic routine is initiated on at least a portion of the test system involved in processing of the output signal and comparing the value of the output signal to the reference value when the value of the output signal falls outside of the acceptable tolerance.

According to another aspect, the present invention provides a test system for testing a device under test to determine whether the device under test satisfies a design parameter. The test system includes at least one of a source for transmitting an electric signal to energize the device under test during a test period and a passive measurement device for conducting a passive measurement that does not require energizing the device under test to be performed. A test component processes an output signal transmitted from the device under test, wherein the output signal comprises at least one of a responsive electric signal transmitted from the device under test in response to being energized and a passive signal corresponding to the passive measurement. A comparison component conducts a comparison of a value of a property of the output signal to a reference value. Further, a control unit determines whether the value of the output signal is within an acceptable tolerance of the reference value in response to said comparison, and initiates a diagnostic routine on at least one of the source, the passive measurement device, the test component and the comparison component when the value of the output signal falls outside of the acceptable tolerance.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF ILLUSTRATIVE EMBODIMENTS

Figure 1:
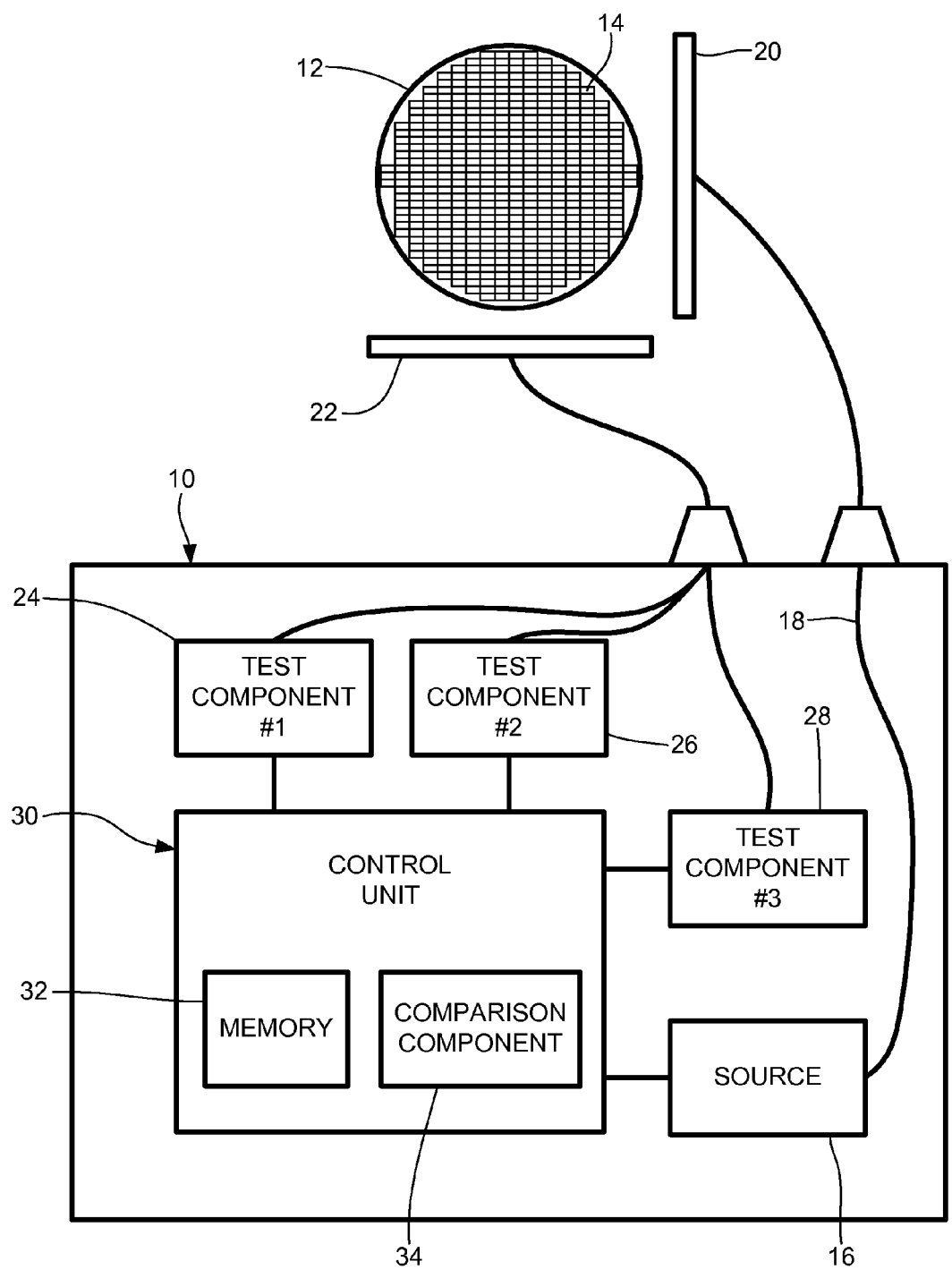
FIG. 1 shows a block diagram of a test system according to an embodiment of the invention adapted to test a device under test.

Certain terminology is used herein for convenience only and is not to be taken as a limitation on the present invention. Relative language used herein is best understood with reference to the drawings, in which like numerals are used to identify like or similar items. Method steps illustrated in a flow diagram are not limited only to the order in which they appear. Further, in the drawings, certain features may be shown in somewhat schematic form.

It is also to be noted that the phrase "at least one of" followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

FIG. 1 schematically depicts a test system 10 for testing a device under test ("DUT") 12 to determine whether the DUT 12 functions as designed. As shown, the DUT 12 is in the form of a wafer formed from a semiconductor material such as single-crystal silicon, gallium arsenide or any other suitable semiconducting substance. A plurality of individual integrated circuits 14 are formed on the DUT 12, to be cut apart as die pieces. Some or all of the integrated circuits 14 are to be tested by the test system 10 to determine whether those tested integrated circuits 14 function as designed, and are thus approved to be used in the production of electronic devices. Those integrated circuits 14 that are tested and found to be malfunctioning can then be die cut and discarded to prevent them from being shipped to customers that produce the electronic devices.

As used herein, the phrase "device under test" 12 (also abbreviated as DUT 12) refers to the actual devices such as the collection of operable integrated circuits 14 formed on semiconducting wafer substrates being tested by the test system 10 before being transported to electronic device manufacturers, or otherwise placed in commerce. Other electronic circuits to be tested for proper operation also fall within the scope of the DUT 12. The testing can be performed for quality control purposes as part of the integrated circuit 14 fabrication process. The integrated circuits 14 have utility outside of the test environment where they are tested by the test system 10 for malfunctions, as opposed to a calibration device developed specifically to calibrate and generate test signals to diagnose instrumentation problems.

The test system can include at least one of a source 16 for transmitting an electric signal to energize the DUT 12 during a test period and a passive measurement device such as a caliper, etc. . . . (not shown), that conducts passive measurements on the DUT 12 that do not require the DUT 12 to be energized to be performed. An example of a passive measurement includes, but is not limited to, a thickness of an oxide layer provided to the DUT 12. The at least one of the source 16 and the passive measurement device are provided for interrogation of the DUT 12 during testing. For embodiments that include the source 16, the electric signal transmitted by the source 16 can be delivered via a conductor 18 to a probe 20 that can establish an electric connection between the source 16 and the DUT 12. The probe 20 can include a set of contact pins (not shown) that extend from the probe 20 and are spaced to cooperate with input/output pins, pads or other such portions provided to the DUT 12. The electric signal transmitted by the source 16 energizes the DUT 12, or a portion thereof, at least temporarily. When functioning as designed and therefore satisfying the design parameters of the DUT 12, the DUT 12 responds to being energized by conducting its own electric signal(s), also referred to herein as a responsive electric signal, that can be input to the test system 10 via a test probe 22, for example, when an electric connection is established between one or more contact pins (not shown) extending from the test probe 22 and appropriate contact points on the DUT 12.

A plurality of test components 24, 26, 28 are also provided to the test system 10 for processing the output signal, which can optionally include a responsive electric signal transmitted from the DUT 12 and received by the test probe 22 in response to the DUT 12 being energized. A passive signal corresponding to the passive measurement can also optionally be included in what is referred to herein as the "output signal" from the DUT 12. Thus, the output signal responsive to interrogation of the DUT 12 can include at least one of: (a) any signal or other output transmitted from the DUT 12, or sensed at locations of the DUT 12 where "tapped" by the test probe 22, in response to being energized that can be analyzed to provide and indication of whether the DUT 12 is functioning as designed; and (b) a passive signal generated by a portion of the test system 10 to represent the passive measurement. For example, the output signal can be a value of a property such as voltage, current, frequency, phase, oxide thickness, or other physical dimension of a portion of the test system 10, and the like that is expected to be generated in response to the interrogation of the DUT 12 by the test system 10.

The output signal is transmitted to the appropriate test component 24, 26, 28 for determining the value of the property of the output signal. The test component 24, 26, 28 may be, for example, voltmeters, ammeters, source-measure units, ohmmeters, inductance meters, capacitance meters, frequency meters, as well as any other electrically operated testing device, and do not all have to measure a value of the same property. In addition, one or more of the test components 24, 26, 28 may work in conjunction with the source 16, or include its own source.

A control unit 30 can be provided to govern operation of the various components of the test system 10. The control unit 30 may be, for example, a separate controller/computer communicating with the test component 24, 26, 28 and source 16, or a programmed function within one or more of the devices. It is also possible, but less desirable, for the control unit 30 to be a manually-operated unit that conducts control operations performed by an operator.

In the case of a machine implementation, control unit 30 can optionally include a central microprocessor that executes instructions embodied by computer-executable logic stored in a memory 32 in communication with the control unit 30. When operating according to the computer-executable instructions, the control unit 30 forms a special purpose computer programmed to perform the method of diagnosing a measurement instrument to determine whether a condition of the measurement instrument contributed to an undesirable measurement result disclosed herein.

A comparison component 34 is also provided to the control unit 30 for comparing the value of the property of the output signal to a reference value to determine if the measured value of the property is within an acceptable tolerance of the value expected in response to interrogation of the DUT 12. The comparison component 34 can be formed by the special purpose computer performing the steps dictated by execution of the computer-executable logic stored in the computer-readable memory 32. According to alternate embodiments, the comparison component 34 can include a comparator, operational amplifier or other suitable hardware, alone or in combination with computer-executable logic stored in the memory 32. According to other embodiments, the comparison component 34 can optionally be provided to one or more of the test components 24, 26, 28, such as a SMU for example.

The reference value for each DUT 12 to be tested by the test system 10 is stored in a computer-readable memory such as memory 32, for example, from where it can be recalled to be compared to the output signal from the DUT 12 obtained during testing. The reference value is the expected value of the output signal from the DUT 12 to be measured in response to being interrogated during testing if the DUT 12 is functioning properly. Further, the test parameters such as the voltage, current, frequency, etc. . . . of the electric signal transmitted by the source 16 to stimulate and interrogate the DUT 12 during an actual test are also stored in the memory 32. When the comparison component 34 determines that the value of the output signal from the DUT 12 during a test falls outside of an acceptable tolerance from the reference value, then a limited diagnostic routine of just the portion of the test system 10 utilized in conducting that test can be initiated by the control unit 30. Unlike a regularly scheduled diagnostic routine, this limited diagnostic routine is initiated by the control unit 30 in response to analyzing the outlying measurement of the output signal. Further, the limited diagnostic routine uses the stored reference value(s) and test parameters to simulate testing of a DUT 12 that is known to function properly. Also, the extent of the test system 10 on which the limited diagnostic routine is to be conducted can also be limited to those portions of the test system 10 utilized in analyzing the outlying output signal.

The limited diagnostic routine simulates testing of a DUT 12 that is known to be fully operational, utilizing an internal source 16, e.g., to generate the electric signal transmitted to energize the DUT 12 and the output signal of the simulated DUT 12. According to the limited diagnostic routine, a direct electric connection between the source 16 and the test component(s) 24, 26, 28 can be established to measure the parameters (e.g., voltage, amperage, frequency, phase, etc. . . . ) of the electric signal used to energize the DUT 12 during the test that resulted in the outlying measurement of the output signal. Since the desired parameters of the electric signal from the source 16 to energize the DUT 12 during testing are known, a parameter having a value other than the desired value, as measured by one or more of the test component(s) 24, 26, 28, can implicate the source 16 as a potential cause of the outlying measurement of the DUT 12 during actual testing.

Likewise, the control unit 30 controlling the limited diagnostic routine can also cause the source 16 to be electrically connected to communicate with one or more of the test components 24, 26, 28 and transmit a simulated output signal to those test components 24, 26, 28. The parameters of the simulated output signal can be stored in the memory 32, and correspond to the parameters of an output signal that would be generated by the simulated DUT 12, which corresponds to a DUT 12 known to function properly. In other words, the simulated output signal has parameters that, when measured by the test component(s) without any malfunctions, should be determined by the comparison component to be within the acceptable tolerances from, and optionally identical to, the reference value.

If the simulation of the limited diagnostic routine also yields a result that is outside of the acceptable tolerance from the reference value as determined by the comparison component 34, then it can be concluded by the control unit 30 that the outlying output signal was caused by the test system 10, and not necessarily a malfunctioning DUT 12. If the diagnostic routine conducted on the limited portion of the test system 10 fails to identify any problems with the test system 10 that contributed to the outlying output signal from the DUT 12, then the extent of the test system 10 on which the diagnostic routine is conducted can optionally be expanded, or other possible sources of error explored.

In operation the control unit 30 determines whether the value of the property of the output signal measured by one or more of the test component 24, 26, 28 is within an acceptable tolerance of the reference value. The reference value can be the expected value of the property of the output signal generated in response to interrogation of the DUT 12. The acceptable tolerances can be the maximum allowable deviations from the reference value in the positive or negative directions, beyond which the measurement result is considered to be undesirable. In other words, if the deviation of the value of the property measured by one or more of the test component 24, 26, 28 is outside the acceptable tolerances from the reference value and the limited diagnostic routine run on the portion of the test system 10 reveals no malfunctions, it will be concluded that the cause of the outlying measurement is external of the test system 10. For example, the operator can be provided with an indication that the DUT 12 is considered to have malfunctioned (i.e., did not satisfy the design parameter) during the test.

After running of the limited diagnostic routine on the test system 10 and determining that the portion of the test system 10 diagnosed did not contribute to the outlying measurement of the output signal as described above, other possible sources of error can be considered. For example, the electric connection between the test probe 22 and/or the probe 20 itself, the atmospheric conditions in which the test was conducted, the DUT 12, and the physical makeup of the DUT 12 itself can be evaluated to determine if one of these other factors was a cause of the outlying measurement of the output signal. A malfunctioning DUT 12 could then be cut from the other die pieces formed from the DUT 12 and recycled, discarded or otherwise identified as a malfunctioning unit and isolated from the units that satisfy the design parameter.

Responsive to the comparison of the value of the output signal's property to the reference value, the control unit 30 can initiate the limited diagnostic routine on a portion of the test system 10 when the value of the output signal's measured property falls outside of the acceptable tolerances. According to an embodiment of the invention, the portion of the test system 10 that is tested includes the test component(s) 24, 26, 28 and comparison component involved in measuring the value of the output signal's property. For example, a first test component 24 can take the form of a voltmeter that measures the value of the voltage of the responsive electric signal included in the output signal, said output signal being generated in response to interrogation of the DUT 12. The measured value for this example is expected to be 5 V in response to the electric signal used to energize the DUT 12, with acceptable tolerances of ±0.5 V. If the measured value is actually 7 V (i.e., outside the acceptable tolerance), then the control unit 30 would initiate the diagnostic routine to be performed on the voltmeter and control unit 30, as those are the two portions of the test system 10 involved in this example to measure the value of the output signal's voltage.

According to other embodiments, the portion of the test system 10 on which the diagnostic routine is conducted is limited to only that portion that is involved in performing and processing the measurement leading to initiation of the diagnostic routine, or only the essential portions of the test system 10 performing and process the measurement. For the example above wherein the voltage of the output signal was measured, the voltmeter and control unit 30 perform the processing of the output signal and the comparing of the value of the property to the reference value.

Figure 2:
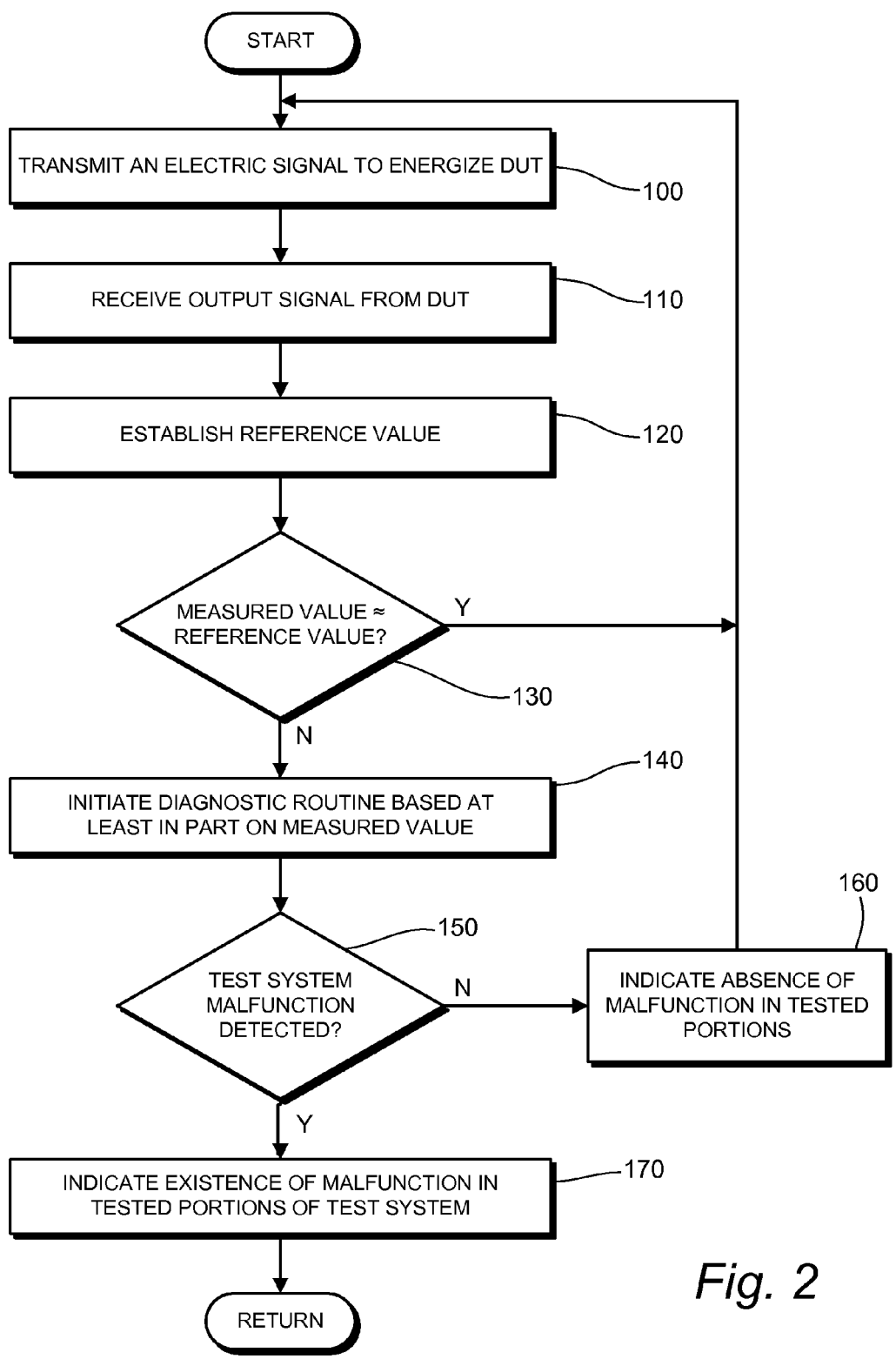
FIG. 2 shows a flow diagram graphically depicting steps of a method according to an embodiment of the present invention.

A method of diagnosing the test system 10 to determine whether a condition of the test system contributed to an undesirable measurement result is described with reference to FIG. 2. The method can optionally be executed as an automated process according to the execution of computer-executable logic stored in the memory 32 by the microprocessor of the control unit 30, or by hardware logic. The memory 32 can be any computer-readable medium such as a magnetic storage medium (e.g., hard disk), optical medium (e.g., CD, DVD), non-volatile or volatile flash memory (e.g., solid state hard drive, jump drive), and the like.

The method comprises transmitting an electric signal to energize the DUT 12 or otherwise interrogating the DUT 12 to conduct a passive measurement at step 100. The electric signal can be transmitted by the source 16 as described above, by another source independent of the test system 10, or by any other suitable signal generator that can energize the DUT 12 for testing. At step 110, the output signal is transmitted from the DUT 12 in response to being interrogated, for example, and received by the test system 10 and processed to obtain the value of the output signal's property (such as the value of the output signal's voltage, for example). As mentioned above, the output signal is indicative of whether the DUT 12 is functioning properly (i.e., satisfies a design parameter, which can optionally be a physical parameter according to alternate embodiments).

A reference value such as the expected value of the output signal's property generated in response to interrogation of the DUT 12 can be established in the test system 10 by a human operator, or retrieved from a database of expected values for various DUTs 12 under a plurality of different test conditions from the memory 32, etc. . . . at step 120. If entered by the operator, the expected value entered can be stored in the memory 32 or another computer-readable memory in communication with the test system 10 until the expected value is to be changed, such as when a different DUT 12 is tested. Establishing the reference value can occur at any suitable time before, during or after energizing and receiving the output signal from the DUT 12.

The comparison component 34 compares the value of the output signal's property to the reference value at step 130. Responsive to this comparison, the control unit 30 determines whether the measured value of the output signal falls within the acceptable tolerances from the reference value. If the determination at step 130 finds that the measured value does fall within the acceptable tolerances from the reference value the method concludes and testing of the next DUT 12 continues without running the limited diagnostic routine.

If, on the other hand, the determination at step 130 finds that the measured value falls outside of the acceptable tolerances from the reference value, then the limited diagnostic routine is initiated on a portion of the test system 10 at step 140 in response to the determination at step 130. The portion of the test system 10 on which the limited diagnostic routine is run includes the portions of the test system 10 involved in the measurement of the value of the output signal's property. This can include all portions of the test system 10 utilized from the moment when the DUT 12 is energized or otherwise interrogated to the moment when the determination at step 130 is made. For example, the diagnostic routine can be conducted on the source 16, each test component 24, 26, 28 utilized to measure the output signal's property, and portions of the control unit 30 such as the comparison component utilized to determine whether the measured value satisfied the predetermined relationship with the reference value. The diagnostic routine can also optionally include interrogation of the probes 20, 22, and any other hardware, software or a combination of hardware and software used to test the DUT 12.

According to embodiments of the present invention, the diagnostic routine can be limited to only those portions of the test system 10 involved in receiving, measuring and processing the output signal to determine its value. Other embodiments limit the scope of the diagnostic routine to essential components involved in the testing of the DUT 12. Such essential components are those that are the most likely to be the source of error in the measured value, and can be identified based at least in part on the nature of the measured value, and optionally on how far beyond the tolerances of the reference value. For example, a value of zero voltage may indicate a faulty voltmeter, a short across the probes, and other such conditions. Thus, the diagnostic routine according to such an embodiment can optionally be directed to start by diagnosing the voltmeter first, followed by other components likely to cause a reading of zero volts as the measured value. According to such embodiments the downtime required between subsequent testing operations for determining whether the test system 10 was a contributing factor to a measured value falling outside of the acceptable tolerances from a reference value is minimized.

As described above, the limited diagnostic routine can compare the reference value to the simulated output signal measured by one or more test components 24, 26, 28 and/or measure the electric signal from the source 16 to confirm that the source and the test components 24, 26, 18 are functioning properly, and did not contribute to the outlying measurement of the actual output signal from the DUT 12 that was being tested when the outlying measurement was taken. If the results of the internal simulation of the DUT 12 performed according to the limited diagnostic routine satisfies all test criteria, then it can be concluded that the source of the outlying measurement resides externally of the test system 10. If the limit diagnostic routine determines that the output signal or electric signal for energizing the DUT 12 during testing is other than desired for the particular test, then the test system 10 can not be ruled out as a possible source of the outlying measurement of the output signal obtained from the DUT 12 that initiated the limited diagnostic routine in the first place.

If, at step 150, the diagnostic routine results in a determination that the portions of the test system 10 checked as part of the limited diagnostic routine functioned as they should, then the diagnostic routine can be terminated and an indication provided at step 160 to indicate that the portions of the test system 10 checked are not malfunctioning before restarting. This indication tells the operator that the outlying value of the output signal's property is not attributable to a malfunctioning portion of the test system 10. The same, or another indication suggesting performance of a manual inspection of an electric connection between the test system 10 and the DUT 12 if the malfunctioning portion is absent from the portion of the test system can also be provided. With this knowledge, the operator can subject the DUT 12 to a second test to confirm that the DUT 12 itself or another factor is responsible for the measured value falling outside of the acceptable tolerances.

If, at step 150 it is determined that the diagnostic routine revealed that the tested portions of the test system 10 were a factor in causing the measured value to fall outside of the acceptable tolerances from the reference value, then this is also indicated to the operator at step 170. The test system 10 can then await a new DUT 12, repeat the test on the existing DUT 12 that caused the diagnostic routine to be initiated, await a manual override to resume testing of DUTs 12 to be input by the operator, and the like, before resuming testing of DUTs 12.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention.

What is claimed is:

1. A method of diagnosing a test system to determine whether a condition of the test system contributed to an undesirable measurement result, the method comprising:
   interrogating a device under test comprising at least one of transmitting an electric signal to energize a device under test by the test system and conducting a passive measurement that does not require the device under test to be energized to determine if the device under test satisfies a design parameter;
   processing an output signal comprising at least one of a responsive electric signal transmitted from the device under test in response to being energized and a passive signal corresponding to the passive measurement;
   comparing a value of a property of the output signal to a reference value;
   responsive to said comparing, determining whether the value of the output signal is within an acceptable tolerance of the reference value; and
   initiating a limited diagnostic routine on at least a portion of the test system involved in the processing of the output signal and the comparing the value of the output signal to the reference value when the value of the output signal falls outside of the acceptable tolerance.

2. The method according to claim 1 further comprising limiting the portion of the test system on which the diagnostic routine is conducted to the portion that performs the processing of the output signal and the comparing of the value of the property to the reference value.

3. The method according to claim 1 further comprising:
   terminating the diagnostic routine after performance of the diagnostic routine on the portion of the test system that performs processing of the output signal and the comparing of the value of the property to the reference value; and
   indicating whether the portion of the test system that performs the processing of the output signal and the comparing of the value of the property to the reference value includes a malfunctioning portion that contributed to determining that the value of the output signal fell outside of the acceptable tolerance.

4. The method according to claim 3 further comprising, responsive to completion of the diagnostic routine, suggesting performance of a manual inspection of an electric connection between the test system and the device under test if the malfunctioning portion is absent from the tested portion of the test system.

5. The method according to claim 1, wherein initiating the limited diagnostic routine comprises:
   establishing an electrical connection between a source for transmitting the electric signal to energize the device under test and a test component for analyzing the output signal from the device under test;
   measuring with the test component the value of a property of the output signal; and
   comparing the value of the property to a desired value of the property stored in a computer-readable memory of the test system.

6. The method according to claim 1, wherein initiating the limited diagnostic routine comprises:
   establishing an electrical connection between a source for transmitting the electric signal to energize the device under test and a test component for analyzing the output signal from the device under test; and
   generating with the source a signal corresponding to a simulated output signal of the device under test, wherein the simulated output signal comprises a parameter value stored in a computer-readable memory of the test system that falls within the acceptable tolerance of the reference value.

7. A test system for testing a device under test to determine whether the device under test satisfies a design parameter, the test system comprising:
   at least one of a source for transmitting an electrical signal to energize the device under test during a test period and a passive measurement device for conducting a passive measurement that does not require energizing the device under test to be performed;
   a test component for processing an output signal transmitted from the device under test to determine a value of a property of the output signal, wherein the output signal comprises at least one of a responsive electric signal transmitted from the device under test in response to being energized and a passive signal corresponding to the passive measurement;
   a comparison component for conducting a comparison of the value of the property of the output signal determined by the test component to a reference value; and
   a control unit that determines whether the value of the output signal is within an acceptable tolerance of the reference value in response to said comparison, and initiates a limited diagnostic routine on at least one of the source, the passive measurement device, the test component and the comparison component when the value of the output signal falls outside of the acceptable tolerance.

8. The test system according to claim 7, wherein the control unit comprises a non-volatile memory storing computer-executable instructions to be executed by a microprocessor for comparing the value of the property to the reference value and initiating the diagnostic routine.

9. The test system according to claim 7, wherein the limited diagnostic routine initiated by the control unit comprises a simulation of the device under test performed by the test system.

10. The test system according to claim 9, wherein a simulated output signal having a known value is generated to simulate the output signal of the device under test, the test component processes the simulation signal to determine a value of the simulated output signal, and the comparison component compares the value of a parameter of the simulated output signal to the reference value to determine whether a portion of the test system contributed to a determination that the value of the output signal from the device under test fell outside of the acceptable tolerance.

11. The test system according to claim 7, wherein the limited diagnostic routine initiated by the control unit comprises transmitting an electrical signal from the source to have a parameter of the electrical signal measured by the test component and compared to a desired value of the electrical signal to determine whether a portion of the test system contributed to a determination that the value of the output signal from the device under test fell outside of the acceptable tolerance.

* * * * *